United States Patent
Wells

(10) Patent No.: US 7,304,605 B2
(45) Date of Patent: Dec. 4, 2007

(54) METHOD OF CALIBRATING AN ADAPTIVE ANTENNA ARRAY OF A SATELLITE NAVIGATION SYSTEM

(75) Inventor: Michael Colin Wells, Romsey Hants (GB)

(73) Assignee: Roke Manor Research Limited, Romsey (GB)

( * ) Notice: Subject to any disclaimer, the term of this patent is extended or adjusted under 35 U.S.C. 154(b) by 213 days.

(21) Appl. No.: 10/989,543

(22) Filed: Nov. 17, 2004

(65) Prior Publication Data

US 2005/0162305 A1    Jul. 28, 2005

(30) Foreign Application Priority Data

Nov. 19, 2003    (GB) ................... 0326906.5

(51) Int. Cl.
*G01S 5/14* (2006.01)
*H01Q 3/00* (2006.01)

(52) U.S. Cl. .................. 342/357.02; 342/372
(58) Field of Classification Search .............. None
See application file for complete search history.

(56) References Cited

U.S. PATENT DOCUMENTS

| | | | |
|---|---|---|---|
| 5,917,446 A * | 6/1999 | Greenspan | 342/373 |
| 5,952,968 A | 9/1999 | McDowell | |
| 6,009,335 A | 12/1999 | Murphy | |
| 6,377,211 B1 * | 4/2002 | Hsiung | 342/359 |
| 6,421,000 B1 * | 7/2002 | McDowell | 342/357.06 |
| 6,690,917 B2 * | 2/2004 | Soliman et al. | 455/12.1 |
| 7,009,557 B2 * | 3/2006 | Kirchofer et al. | 342/359 |
| 7,088,288 B1 * | 8/2006 | Margolese et al. | 342/377 |
| 2002/0147032 A1 * | 10/2002 | Yoon et al. | 455/562 |
| 2002/0169578 A1 * | 11/2002 | Yang | 702/152 |

FOREIGN PATENT DOCUMENTS

| GB | 2 357 385 A | 12/1999 |
|---|---|---|
| WO | WO 01/45302 A1 | 6/2001 |

OTHER PUBLICATIONS

Mathews, Bruce, "Nonlinearities in Digital Manifold Phased Arrays," IEEE Trans on Antennas and Propagation, vol. AP-34, No. 11, Nov. 1986, pp. 1346-1355.*
Alonso J I et al: "Low Cost Electronically Steered Antenna and Receiver System for Mobile Satellite Communications"; IEEE Transactions on Microwave Theory and Techniques, IEEE Inc. New York, US vol. 44, No. 12, Part 2, Dec. 1996; pp. 2438-2448, XP000636426 ISSN 0018-9480.
EP Search Report, Nov. 15, 2005.

* cited by examiner

*Primary Examiner*—Gregory C. Issing
(74) *Attorney, Agent, or Firm*—Crowell & Moring LLP

(57) ABSTRACT

A method of calibrating an adaptive antenna array that applies beamsteering (1) of a satellite navigation system comprises receiving signals from a plurality of satellites at a plurality of receivers (2) within the system. The satellite direction relative to the antenna array orientation for each satellite signal is determined (5); and the received signals are despread (8) to recover satellite signals. Gain and phase information is calculated from the despread code for a given satellite in a given direction; and the calculated gain and phase information are stored in a manifold store (4) at a predetermined address related to the direction of arrival of the satellite signal.

15 Claims, 2 Drawing Sheets

METHOD OF CALIBRATING AN ADAPTIVE ANTENNA ARRAY OF A SATELLITE NAVIGATION SYSTEM

This invention relates to a method of calibrating an adaptive antenna array of a satellite system.

The next generation of adaptive arrays for global positioning system (GPS) are starting to be developed. Current analogue systems and the first generation of digital systems simply minimise the power of any interference, regardless of the satellite signals. These have a signal to noise ratio (SNR) of around −30 dB and are ignored by the adaptive array. The adaptive array may enhance the gain towards a satellite, or it may decrease the gain. The next generation of adaptive arrays will be digital adaptive arrays, which use beamsteering on the satellite signals. Amongst the benefits of beamsteering are that the gain towards the satellite is increased, typically by 8 dB, which improves navigation and further, that the modulation of the GPS signals by the adaptive array is reduced, also improving the navigation accuracy. A further advantage is that the more directive beam pattern reduces multipath from other directions, also improving navigation accuracy.

In order to implement beamsteering the adaptive array needs to know the manifold, generally in the form of a look up table that records how the complex gains of each of the antenna elements change with direction.

Conventionally, the manifold is obtained by measuring the antenna array in an anechoic chamber. This has a number of disadvantages including the fact that anechoic chamber time is expensive, the manifold of an antenna array will change depending on which platform it is fitted to, and maintenance work may invalidate the manifold and require it to be remeasured. Actually putting an antenna array on its platform in an anechoic chamber is often impractical, for example if the platform is an aircraft, which is rather larger than the average anechoic chamber.

In accordance with a first aspect of the present invention, a method of calibrating an adaptive antenna array suitable for beamsteering of a satellite system comprises receiving spread spectrum satellite signals from a plurality of satellites at a plurality of receivers within the system; determining satellite direction relative to the antenna array orientation for each satellite signal; despreading the received signals to recover the satellite signals; calculating gain and phase information from the despread signals for a given satellite in a given direction; and storing, in a manifold store, the calculated gain and phase information at a predetermined address related to the direction of arrival of the satellite signal.

The present invention provides a method of automatically obtaining the antenna gain and phase information needed to perform adaptive beamsteering for an adaptive array of a satellite navigation system. This avoids the need for calibration of the antenna array in an anechoic chamber and allows local scattering effects of the platform on which it is deployed to be automatically taken into account. The invention uses the satellite signals themselves as test sources with known directions in order to calibrate the antenna array.

Preferably, the unoptimised receiver data is sampled simultaneously from at least two receivers.

Preferably, a common Doppler offset and code timing is used for correlation at each of the plurality of receivers.

Preferably, the gain and phase information is derived by correlating data from a first receiver with a code for that satellite; correlating data from a second receiver using the common Doppler offset and code timing obtained for the first receiver; and repeating this second correlation step for all subsequent receivers, such that a vector of the complex correlation is constructed.

Preferably, a high elevation satellite with a strong signal is selected for processing first to derive the common Doppler offset and code timing.

Preferably, gaps in the manifold store are filled by interpolating previously derived gain and phase data.

Typically, signals from between 6 and 12 satellites are received.

The satellite system could be a satellite communication system which transmits a pilot tone for antenna calibration purposes, but preferably, the satellite system is a satellite navigation system.

The advantage of this is that the method uses the satellite signals transmitted for navigation purposes for calibration, rather than needing an additional specific signal to be provided.

The method of the present invention is applicable to any satellite system, but preferably, the satellite system is one of global positioning system (GPS) and Galileo.

In accordance with a second aspect of the present invention a self calibrating adaptive antenna array apparatus for a satellite system comprises a plurality of receivers for receiving spread spectrum satellite signals from a plurality of satellites within the system; a plurality of adaptive beamformers for optimising each receiver for a different satellite signal; recovering means for determining direction of arrival of each satellite signal relative to the antenna array orientation; a processor for despreading the received signals to recover the satellite signals and calculate gain and phase information from the despread signals for a given satellite in a given direction; and a manifold store for storing the calculated gain and phase information at a predetermined address related to the direction of arrival of the satellite signal.

This invention enables an adaptive array for a satellite receiver to calibrate itself by using the satellite signals themselves.

Preferably, the satellite system is a satellite navigation system.

An example of a method of calibrating an adaptive antenna array of a satellite navigation system and a self calibrating adaptive antenna array apparatus in accordance with the present invention will now be described with reference to the accompanying drawings in which.

Figure 1:
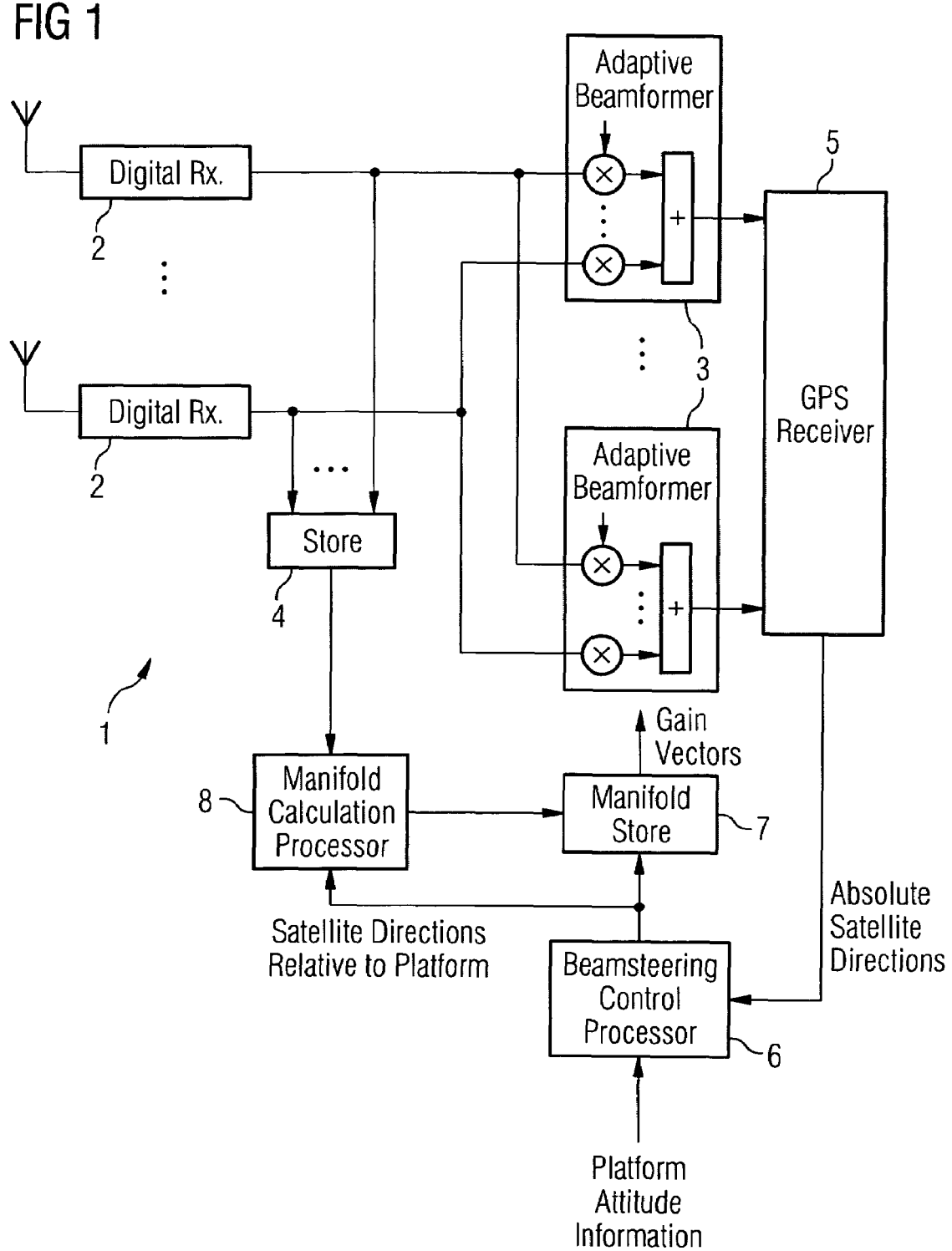
FIG. 1 shows a self-calibrating beamsteering adaptive array in accordance with the present invention, for GPS.

In the present invention an adaptive array calibrates itself, in-situ, taking account of the scattering from the platform it is fitted to. FIG. 1 shows an example of an adaptive array 1 which comprises at least two digital receivers (downconverters) 2 and at least two adaptive beamformers 3. The receivers 2 receive RF signals at their antennas and convert the RF signals to complex digital baseband within their circuits. Each receiver 2 provides an input to every adaptive beamformer 3 simultaneously and also to a store 4. Each adaptive beamformer optimises the gain towards one satellite by adapting its weighting, while cancelling any interference. Satellite signals are well below the noise level, so one cannot get direct gain and phase data. The beamformed signals are the best ratio of signal to interference plus noise for the respective satellite. These are output from each adaptive beamformer and input to a tracking channel in a receiver 5, GPS for this example, via a digital interface and the receiver 5 recovers the satellite signals for navigational purposes in a conventional manner by despreading the received spread spectrum signal, measuring the timing and extracting advance information. The GPS receiver 5 is able to output the absolute direction of each satellite that it is tracking and this data is input to a beamsteering control processor 6 as azimuth and elevation data relative to true north. The control processor 6 combines the satellite direction information with platform attitude information, typically from an inertial navigation system (not shown), in order to compute the directions of the satellites relative to the orientation of the antenna array 1. Corresponding gain vectors are then looked up in a manifold store 7 and supplied to the adaptive beamformers 3, so that they can optimise the gain, i.e. beamsteer, on the satellites.

The diagram of FIG. 1 illustrates a self-calibrating beamsteering adaptive array for GPS provided with only two receivers for simplicity, but in general at least seven receivers and twelve adaptive beamformers would be provided, with corresponding. connections to one another and the store. The number of adaptive beamformers is determined by the maximum number of satellites that the GPS set can track simultaneously, whereas the number of receivers is related to the number of satellites visible at any one time, which tends to be between 5 and 12.

The content of the manifold store 7 is derived in a manifold calculation processor 8 using the satellite direction information relative to the platform as provided by the beamsteering control processor 6 and unrecovered baseband data direct from each digital receiver from the store 4. The processor 8 collects a block of the receiver data. The receiver data is sampled simultaneously in at least two of the receivers 2. This data is then processed in the processor 8 to recover the satellite signals. A common Doppler offset and code timing is used for the two or more receivers, so that the difference in amplitude and phase of the resulting correlation peaks relates just to the difference in gain of the antenna array, and receivers, for the given satellite direction.

The inputs to the manifold calculation processor 8 are a list of the satellites that are currently visible, their azimuths and elevations relative to the platform and a block of data that was collected simultaneously from at least two downconverters 2. To measure the relative gains and phases in this example for a GPS system, the GPS coarse acquisition (C/A) code is typically used, as this is a simple unencrypted code. Other codes could be used depending upon the satellite system and security limitations. The size of the data block needs to be large enough for sufficient integration gain to be available to recover the satellite signals. Typically this is around 20 ms of data. The manifold calculation processor proceeds in a number of steps. For the first step it needs to acquire the satellite signals, just like a normal GPS receiver. A strong (high elevation) satellite signal is selected and then a search in time and Doppler is performed by correlating the data from one of the downconverters with the code for that satellite. This is typically performed in 1 ms coherent blocks with incoherent combining of the block results to give a total integration time of 20 ms. Once the initial code time and Doppler frequency have been estimated, these estimates can be refined by determining any code phase transition and calculating the coherent combination of the blocks across the 20 ms.

The next step is to calculate the correlation for the data from the second downconverter using the same code time and Doppler frequency offset. If data from more than two downconverters 2 was collected then this is also repeated for the other downconverters. A vector of the complex correlations (v) can then be constructed containing the correlation for each digital downconverter 2. The gain vector for the direction of arrival of the satellite is then simply:

$$g(az,el) = v/v_1$$

where $v_1$ is the complex correlation for the first downconverter. This expresses the complex gains relative to the first downconverter. If the data from only two downconverters was collected, then subsequent collections should always include downconverter 1.

The next step undertaken by the manifold calculation processor 8 is to repeat the above calculations for the other satellites in the list. The code timing estimate from the first satellite can be used to reduce the uncertainty in the code timing for the other satellites.

Figure 2:
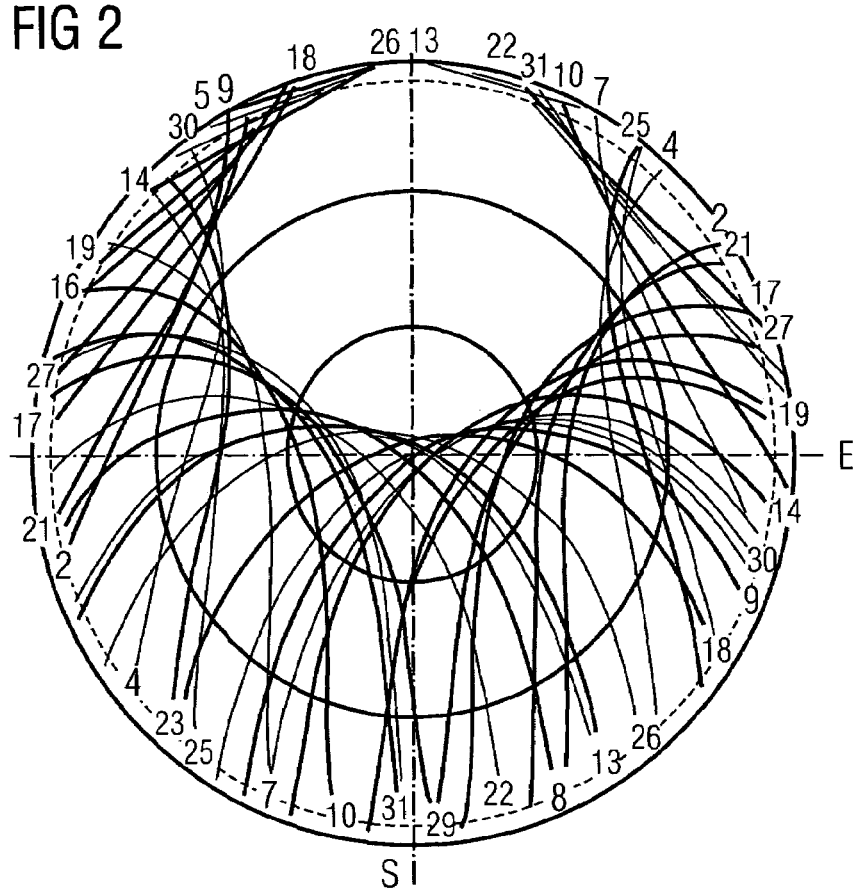
FIG. 2 illustrates a sky plot of satellite coverage for calibration of a GPS receiver using a method in accordance with the present invention.

During the course of the calibration a long list of gain vectors will be measured. FIG. 2 illustrates a typical sky plot showing how satellite coverage changes with time (in hours), sampling every 10 minutes, and also giving an indication of which satellites are available to use in the calibration process. In this example, the measurements were taken at Lat 50:58:0 N, Lon 1:34:0 W, with a threshold elevation of 5 degrees and 27 satellites were considered. It can be seen that little coverage is achieved to the North in this example. To overcome this, the platform can be rotated 180° in azimuth mid-way through the calibration.

The manifold store is likely to store the gain information on a regular grid in azimuth and elevation. At the end of the calibration, the processor 8 can directly fill in the manifold store with the gain vectors that coincide with grid values. For the grid values that do not directly coincide with a measured direction of arrival, interpolation of the measured values can be used to give the required gain vector.

The gain values measured by the above process are strictly a combination of the relative antenna array gains and the relative downconverter array gains. Although not shown in FIG. 1, it is assumed that the downconverters 2 include a receiver calibration process (needed for beamsteering anyway) that periodically injects a common test signal into the downconverters, measures their relative gains and then applies corrections in each downconverter to remove any mismatch.

During the period when the manifold information is incomplete the adaptive beamformers can operate in a non-adaptive mode where a single antenna signal is simply passed to the output of the beamformer. The user can choose to perform the self-calibration at a time and place in which good signals can be obtained from the satellites i.e. away from obstructions and sources of interference. Once calibrated, the values remain valid unless the cable connections or platform on which the array is mounted change.

A major advantage of an adaptive, i.e. beamsteering array, is that it makes the satellite signals stronger e.g. by up to 8 dBs. This allows reception of satellites with low signal e.g. due to trees etc, and improves the navigational performance of the system, by increasing satellite availability, which is particularly useful for landing aeroplanes. Self-calibration ensures that the most accurate values of gain are present in the manifold store, improving the effectiveness of the beamsteering.

The invention claimed is:

1. A method of processing satellite signals received by an adaptive antenna array, the method comprising:

receiving spread spectrum satellite signals from a plurality of satellites at a plurality of receivers within the system and downconverting the received signals;

beamforming the downconverted signals using gain and phase information;

receiving, by a navigation receiver, the beamformed signals and despreading the beamformed signals;

determining, by the navigation receiver, a satellite direction relative to the antenna array orientation for each satellite signal using the beamformed signals;

receiving, by a manifold calculation processor, the downconverted signals and the determined satellite direction;

despreading, by the manifold calculation processor, the received signals to recover the satellite signals;

calculating, by the manifold calculation processor, gain and phase information from the signals despread by the manifold calculation processor and the determined satellite direction; and storing, in a manifold store, the gain and phase information calculated by the manifold calculation processor, at a predetermined address related to the direction of arrival of the satellite signal.

2. A method according to claim 1, wherein the manifold calculation processor receives downconverted signals from at least two receivers.

3. A method according to claim 1, wherein a common Doppler offset and code timing is used for correlation at each of the plurality of receivers.

4. A method according to claim 3, wherein the gain and phase information is derived by correlating data from a first receiver with a code for that satellite; correlating data from a second receiver using the common Doppler offset and code timing obtained for the first receiver; and repeating this second correlation step for all subsequent receivers, such that a vector of the complex correlation is constructed.

5. A method according to claim 3, wherein a high elevation satellite with a strong signal is selected for processing first to derive the common Doppler offset and code timing.

6. A method according to claim 1, wherein gaps in the manifold store are filled by interpolating previously derived gain and phase data.

7. A method according to claim 1, wherein signals from between 6 and 12 satellites are received.

8. A method according to claim 1, wherein the satellite system is a satellite navigation system.

9. A method according to claim 1, wherein the satellite system is one of a global positioning system (GPS) and Galileo.

10. An apparatus comprising:
 a plurality of receivers for receiving spread spectrum satellite signals from a plurality of satellites within a satellite system;
 a plurality of adaptive beamformers coupled to each receiver and responsive to gain and phase information;
 a navigation receiver that despreads the received satellite signals and determines a direction of arrival of each satellite signal relative to an antenna array orientation;
 a manifold calculation processor, coupled to the plurality of receivers, that despreads the received signals to recover the satellite signals, and calculates gain and phase information using the signals despread by the manifold calculation processor and the direction of arrival of each satellite signal as received from the navigation receiver; and
 a manifold store, coupled to the manifold calculation processor, for storing the calculated gain and phase information at a predetermined address related to the direction of arrival of the satellite signal.

11. An apparatus according to claim 10, wherein the system is a satellite navigation system.

12. A method of processing satellite signals received by an adaptive antenna array, the array comprising a plurality of receivers and adaptive beamformers and a manifold store, the method comprising:
 receiving, by a manifold calculation processor from a beamsteering control processor, satellite direction information relative to the antenna array orientation;
 receiving, by the manifold calculation processor, downconverted signals from each of the plurality of receivers; and
 calculating, by the manifold calculation processor, content of the manifold store by despreading the downconverted signals and using the despread signals together with the satellite direction information;
 wherein the manifold calculation processor collects a block of receiver data, sampled simultaneously in at least two of the plurality of receivers;
 wherein a navigation receiver despreads the downconverted signals and provides satellite direction information to the beamsteering control processor; and
 wherein a common Doppler offset and code timing is used for the at least two receivers, so that the difference in amplitude and phase of resulting correlation peaks relates to a difference in gain of the antenna array and receivers for the satellite direction.

13. A method according to claim 12, wherein the satellite direction information relative to the antenna array orientation comprises a list of satellites that are currently visible, their azimuths and elevations relative to the platform.

14. A method according to claim 13, wherein the manifold calculation processor selects a high elevation satellite signal and performs a search in time and Doppler by correlating the data from one of the plurality of receivers with the code for that satellite;
 wherein the processor calculates the correlation for the data from the second receiver using the same code time and Doppler frequency offset and repeats this for other receivers of the plurality of receivers from which data was collected; whereby a vector of the complex correlations is constructed containing a correlation for each receiver, and whereby a gain vector for the direction of the arrival of the satellite is derived; and
 wherein the manifold calculation processor repeats these steps for other satellites in the list.

15. A method according to claim 14, wherein the manifold store stores the gain information on a regular grid in azimuth and elevation and at the end of the calibration, the manifold calculation processor directly fills in the manifold store with the gain vectors that coincide with grid values; and
 wherein interpolation of the measured values is applied to give the required gain vector for the grid values that do not directly coincide with a measured direction of arrival.

* * * * *